United States Patent [19]

Koch et al.

[11] 4,102,848

[45] Jul. 25, 1978

[54] INCORPORATION OF FOOD GRADE DYESTUFFS INTO RESINOUS COMPOSITIONS AND ARTICLES PREPARED THEREFROM

[75] Inventors: Louis Koch, Yonkers, N.Y.; Michael Dunn, New Milford; Charles Lumpkin, Ridgewood, both of N.J.

[73] Assignee: H. Kohnstamm & Company Inc., New York, N.Y.

[21] Appl. No.: 229,486

[22] Filed: Feb. 25, 1972

[51] Int. Cl.$^2$ .......................... C08J 3/20; C08K 5/00
[52] U.S. Cl. .................... 260/31.6; 106/180; 106/193 D; 106/241; 106/308 F; 260/37 P; 260/42.21; 260/40 R
[58] Field of Search ............... 260/41 C, 42.21, 37 P, 260/31.6, 40 R; 8/41; 106/180, 193 D, 241, 308 F

[56] References Cited

U.S. PATENT DOCUMENTS

| | | | |
|---|---|---|---|
| 3,148,125 | 9/1964 | Strianse et al. | 424/64 |
| 3,222,355 | 12/1965 | Gaetani | 260/41 C |
| 3,677,691 | 7/1972 | Koch | 8/41 |

OTHER PUBLICATIONS

Polythene—Renfrew & Morgan, Interscience, 1957, p. 435.

Primary Examiner—Allan Lieberman

[57] ABSTRACT

The invention described relates to a method for the manufacture of resinous formed articles which are color tinted with dyestuffs which are normally considered to be incompatible therewith. These dyestuffs, such as certified F.D. and C Yellow No. 5, are accepted non-toxic colorants for foods, drugs and cosmetics but by themselves are normally incompatible with oils, waxes and resins. By first complexing these water soluble, resin insoluble dyestuffs with a polyhydric alcohol, such as glycerine, and subsequently the higher fatty acid ester decaglycerol tetraoleate in the presence of heat, it is possible to prepare a uniformly colored resin solution or paste which can be further cured to form a color tinted transparent plastic film or sheet useful in the packaging of foods, drugs and cosmetics. The resinous substrate which is colored may be either a thermoplastic resin such as polyvinyl chloride, polyvinyl acetate or polyethylene polypropylene, or acrylic resins alone or blended with ABS rubber and other copolymers. It may also be a thermosetting resin, such as a polyester.

11 Claims, No Drawings

INCORPORATION OF FOOD GRADE DYESTUFFS INTO RESINOUS COMPOSITIONS AND ARTICLES PREPARED THEREFROM

BACKGROUND OF THE INVENTION

The use of plastic sheet material such as polyvinyl chloride and the polyolefin plastics such as the polyethylenes and the polypropylenes has been recently approved by the United States Food and Drug Administration for the manufacture of transparent bottles and other containers for food products. As indicated in the Apr. 5, 1969 edition of "Chemical Week," on page 47, the bottling industry is forecasting resin consumption for this purpose to grow to more than 150 million pounds within the next five years and changes in the use of molded polyvinyl chloride food containers indicate this to be realistic.

The major resins which are coming into widespread use for food packaging are polyethylene, polyvinyl chloride, polystyrene, acrylic resins alone or blended with ABS rubbers and polypropylene since in the bottling industry alone, the use of these resins has considerable economy, increased transparency, ease of handling economics such as lower shipping cost and less breakage and product protection in that they act as a very effective barrier to oxygen and thus assist in the preservation of the food content. However, at the present time, there are no acceptable organic dyestuffs which are approved for use in contact with foods and beverages, medicinal products or cosmetics and at the same time are compatible with any of the aforesaid principal resinous molding compositions. In the instance where it has been sought to introduce color into such molded containers, it has heretofore been necessary to mount the dye on a carrier such as aluminum hydrate. In addition to the obvious loss of transparency of the plastic container due to the inclusion of the opaque pigment particles, there has been encountered a problem which is particularly acute with those resins, such as polyethylene and polypropylene where it is necessary to mold the resinous compositions with temperatures on the order of 350° F. Under these molding conditions, the aluminum hydrate carrier for the pigment thermally decomposes and releases its bound water which thereupon forms minute droplets which ultimately join to form bubbles and blisters in the final molded article.

In still other instances, where it is sought to blend presently acceptable food grade organic dyestuffs with a resinous polymer solution, the dyestuff particles being insoluble in the resin solution, do not uniformly disperse themselves through the polymer liquid and result in a final molded product which has a granular or grainy appearance which is ineffective as a means of color distribution in the plastic molded article. This is the result of the insolubility of certified F.D. and C colors in organic solvent systems such as methyl ethyl ketone or acetone or liquids having a higher hydrocarbon moiety. Under these conditions these colors will persist as undissolved discrete particles having little or no tinctorial power. Even where high sheer mixing techniques have been employed in an effort to increase the particular dispersion of the insoluble organic dyestuff in the resinous base, it has not heretofore been practical to maintain a uniform color distribution during the course of transport and usage of the molding composition up to the point where it is completely molded into a shaped package, bottle or container. As a consequence, therefore, the use of attractive coloration which is also cleared as safe from potentially harmful side effects has been limited to the use of titanium dioxide pigment which, of course, gives color but prohibits transparency and lake pigment which must be employed on a carrier substance which also obviates transparency in the article tinted or colored.

It is an object of the present invention to overcome all of these disadvantages in the art of coloring plastic food, drug and cosmetic containers and to present to the art a resinous molding composition which is not only acceptable as safe for contact with consummable items but which resin is also colored in various shades and transparent to any degree desired.

It is a further object of the invention to describe a new and unexpected technique which comprises the compatible blending and uniform solution of food grade color additives which are normally considered to be incompatible with resinous solutions in all proportions. These and several other objects of the invention will become clear upon further consideration of the detailed description of the invention set forth in the following general description and several selected and preferred modes of its practice.

BRIEF DESCRIPTION OF THE INVENTION

Accordingly, the discovery which provides the subject matter of the present invention involves a finding that it is, in fact, possible to manufacture resinous molding compositions and articles which are capable of being uniformly tinted or colored while at the same time such coloration does not require that the transparency of the resinous film or solid aspect of the molded article be obliterated by the inclusion of large quantities of pigment material which act to opacify the molded articles. Equally as important from a practical rather than an esthetic viewpoint, is the finding that one may manufacture a food, drug or cosmetic container which has been dyed in a variation of one or a combination of red, yellow, orange, green, blue and other blended hues derived from a relatively large number of normally resin incompatible certified food, drug and cosmetic color additives which have been approved and generally recognized as safe for use in contact with edible products by the Food and Drug Administration.

The importance of this latter finding is significant because the only presently known organic dyestuffs which are accepted for use in food containers are water soluble, oil and resin liquid insoluble materials and up to the time of the present discovery, had not been able successfully to be dispersed in a resinous base of any type.

In brief, Applicant has found that if one of many water soluble, resin liquid insoluble organic dyestuffs such as for example, the dyestuff tartrazine, is first treated by a unique two-step preconditioning process, it is transformed from a water soluble, resin liquid insoluble material into a water insoluble, resin soluble complex. The heated complex is allowed to stand. The unreacted glycerine dye solution will settle and the supernatant color complex will form in a separate layer. In the form of the complex, therefore, these dyestuffs will completely permeate the resin solution in such a manner that they diffuse a color tint throughout. This two-step preconditioning process for the resin liquid insoluble organic dyestuffs involves first of all admixing an equal part of the dyestuff to be converted with glycerine at room temperature. After stirring this solution for several minutes to distribute the dyestuff throughout, the dyestuff glycerine solution is admixed in a ratio of one part of seven parts of a solution of the ester, decaglycerol tetraoleate. While this addition of reagents is being conducted, a constant stirring takes place at a temperature of about 100° C so as to result, eventually, in the formation of a complex which is fully and completely miscible with the principal resins employed in the manufacture of molded food containers, namely, polyvinylchloride, polyvinyl acetate, high density polyethylene, polypropylene or acrylic resins such as polymethylmethacrylate, polyethylmethacrylate and alkylated acrylate resins such as ethyl acrylate, methyl acrylate or mixtures of these acrylics.

In the case of a thermoplastic resin for example, such as polyvinyl chloride, this resin normally is prepared as a paste using a dibutyl phthalate plasticizing agent to maintain some fluidity in the material. Purely for purposes of an increase in speed, one may add a plasticizer to reduce the viscosity of the resin prior to the addition of about one part of the color complex additive for each 100 parts of the resinous material which is to be color tinted. In general a minor amount of the color complex is admixed into a major amount of the liquid containing resin solids. If the viscosity of the resin solution is sufficiently reduced, it is quite possible to completely diffuse the color additive through the polymer mass by simple hand stirring of the mixture. On the other hand, if it is desired to work with a polymer emulsion, then it is a simple matter of thinning out the resinous emulsion by addition of a plasticizer until a thickness is obtained which makes it practical to admix the color agent to the resin by hand mixing.

The following examples are presented to illustrate the practice of some preferred modes of our invention especially to illustrate the use of our novel color complex in the coloring of various thermoplastic and thermosetting resin molding powders. The methods described in these examples have never been heretofore disclosed and the colored molding powders obtained, present, for the first time, resins which have a color note contributed by previously incompatible organic dyestuffs. Unless otherwise indicated, the amounts described are set forth in percent or parts by weight of the ingredients employed.

EXAMPLE 1

This example illustrates the use of Applicants' coloring method as applied to a solution of a copolymer of 86% by weight vinyl chloride and 14% by weight vinyl acetate which has a viscosity in centipoises of 250 to 500, and is marketed by the Union Carbide Corporation under the trade name VYHH Resin. This illustration involves the coloring of a molding powder which has been totally dissolved in an organic solvent which in this case happens to be methylethyl ketone but could equally be other known organic solvents in which the vinyl chloride-vinyl acetate copolymer is also soluble such as methylisobutyl ketone or toluene or a mixture of the two.

A. METHOD OF COLORATION 100 parts of the liquid color concentrate are prepared by first admixing 20 parts of F.D. and C Yellow No. 5 Dye with 80 parts of glycerine to form a first solution which is then mixed with 100 parts of decaglycerol tetraoleate ester. After mixing glycerine color solution and decaglycerol tetraoleate at 1:7 ratio, the heated complex is allowed to stand. Unreacted glycerine dye solution will settle and the supernatant complex is the effective color agent. This blend is first mixed with methylethyl ketone in an equal amount until the two are intimately admixed. At this point, the vinyl chloride-vinyl acetate copolymer also present in amounts of 100 parts by weight, is added and carefully stirred until a thorough homogenous distribution of the color agent is distributed through the solution of resin solids and organic solvent.

B. METHOD OF FORMING COLOR CHIPS

The colored organic solution of resin solids is passed over a cold two-roller mill which reduces the temperature of the resinous mix and causes the formation of a film. After 2 minutes of milling, cut the film and feed it back into the nip of the rollers. This should be done at the rate of about 12 times per minute if an automatic type arrangement is provided on the roller mill. During this time it will be noted that heat is evoked by the system since an exothermic reaction is taking place. The milling is continued and the cutting and feeding to the nip of the film until chips are formed. These chips are collected by suitable means and provide what can be ground into a molding powder for purposes of the following step of completion molding or film formation.

C. FINAL FILM FORMATION 20 parts of the colored molding powder are placed along with 80 parts of the organic solvent material methylethyl ketone, along with 100 parts of steel balls in a steel containing vessel which is the equivalent of a ball mill. This vessel is agitated for 10 minutes and the liquid color dispersion is removed therefrom and laid down as a film by passing the same over a rotating heated drum which removes the colored film by means of a doctor blade. At this point there is obtained a colored film which is particularly chararacterized and noted for its homogenity of the color throughout every portion of the film without any variations in color particle concentration or intensity of color in any given segment of the film.

A good deal of the processing of the film is standard technology and, therefore, has not been elaborated as to details, which details are quite well known to those skilled in the art of forming resinous films from solutions of resins in organic solvents. One particularly striking use of this colored film is its use as a tinted decorative layer or pattern when imposed upon a clear plastic film by means of the gravure method.

EXAMPLE II

Method of Preparing Colored Film of Polyvinyl Chloride Resin

Into a ribbon blender, preheated to 150° F, is charged 100 parts of a polyvinyl chloride resin molding powder (Pliovic K-80 manufactured by Goodyear Tire and Rubber Company, Akron, Ohio). In a separate vessel, mix a composite of the following liquid ingredients:

| Ingredient | Parts/Weight |
| --- | --- |
| Dioctylphthalate | 23.0 |
| Dioctyl Adipate | 15.0 |
| Stearic acid | 0.2 |
| Calcium-zinc stearate | 2.0 |

This liquid mixture above is slowly added to the dry resin solids along with 3 parts of a color complex of the following composition which is added prior to addition to the resin in the blender.

| Ingredient | Amount (%) By Weight |
|---|---|
| Brilliant Blue F.D.& C.No.1 | 2.5 |
| Glycerine | 10.0 |
| Decaglycerol tetraoleate | 87.5 |

This color complex is heated to 100° C and separated as a supernatant liquid layer. Three parts of the layer of solution are admixed with three parts of methylethyl ketone and added to the polymer in the blender which is in the form of a dry powder.

The entire mass is mixed until the blend temperature reaches 190°–200° at the top level of the temperature permitted. Then the mix is ready for the next step in the sequence.

The premixed and precolored resin mass is placed on a 2-roll mill which is heated internally by steam under pressure to a temperature of 330° F and milled while continuously cutting the film and putting the same back into the nip at the rate of 4–5 times per minute. The pressure on the rolls at the nip is adjusted so as to obtain a film of a thickness of 0.018 inches. When after about 10 minutes the film has attained the desired thickness and uniformity of shade, a final cut will permit the film to be removed from the roll.

After cooling, the flexible plasticized and lightly blue tinted film may be trimmed or shaped of use. A flexible film is thus formed which will be suitable for the packaging of food in variously shaped food containers where the edible products are in direct contact with the container.

EXAMPLE III

There is placed in a one-quart vessel, 300 parts of a low melt index commercial polyethylene pellets. There is then added 4 parts of a color composition prepared as in Example II by first admixing 10 parts of tartrazine F.D.&C. Color No. 5 with 40 parts of glycerine, then adding to this first color solution 50 parts of decaglycerol tetraoleate ester while heating the mixture to from 75° to 150° C for about 10 minutes.

The contents of the mixing vessel are placed in the feed hopper of a Killion Extruder equipped with an extrusion die designed to give a continuous colored rod ⅜ inch in diameter at 500° F. This rod is passed while still hot, through a cooling trough, thence to a mechanical chopping device which cuts the now brittle rod into uniformly long pellets of an average of ¼ inch long.

These uniformly colored pellets are fed through a hopper device into a molding machine where the pellets are fluidized by melting at 400° F and forced into a molding cavity. This molding takes place under 3000 p.s.i. and a temperature of about 325° F to give a color tinted bed tray or bottle useful for containing edible food products.

EXAMPLE IV

There is placed in a one-quart vessel, 300 parts of commercial pellets of a high impact ABS co-polymer composed of a 1:1:1 blend of acrylonitrile, butadiene and styrene. There is then added 4 parts of a color composition prepared as in Example II by first admixing 10 parts of the color Brilliant Blue F.D.&C. Color No. 1 with 40 parts of glycerine, then adding to this first color solution 50 parts of decaglycerol tetraoleate ester while heating the mixture to from 75° to 150° C for about 10 minutes.

The contents of the mixing vessel are placed in the feed hopper of a Killion Extruder equipped with an extrusion die designed to give a continuous colored rod ⅜ inch in diameter at 500° F. This rod is passed while still hot, through a cooling trough, thence to a mechanical chopping device which cuts the now brittle rod into uniformly long pellets of an average of ¼ inch long.

These uniformly colored pellets are fed through a hopper device into a molding machine where the pellets are fluidized by melting at 400° F and forced into a molding cavity. This molding takes place under 3000 p.s.i. and a temperature of about 325° F to give a color tinted food tray or bottle useful for containing edible food products.

Although in the preceding Examples the polyglycerol higher fatty acid ester disclosed has been described as the compound decaglycerol tetraoleate, it must be understood that a number of other similar esters of the type disclosed in pending patent application Ser. No. 762,150 (Koch), filed Sept. 24, 1968 and now U.S. Pat. No. 3,677,696, may equivalently be employed. In a similar fashion there is described in the aforesaid patent application, other polyhydric alcohols which are edible food grade materials capable of being substituted for the glycerine which is illustrated in the several preferred embodiments described above.

What is claimed is:

1. A colored, non-toxic, resinous molding composition which comprises a major amount of a liquid containing thermoplastic or thermosetting resin solids and a minor amount of a color additive complex comprising an edible water soluble resin liquid insoluble food grade dye, a polyhydric alcohol and a polyglycerol higher fatty acid ester.

2. A colored transparent resinous molding composition according to claim 1 wherein the polyglycerol higher fatty acid ester component of the color complex is decaglycerol tetraoleate.

3. A colored transparent resinous molding composition according to claim 1 wherein the polyhydric alcohol component of the color complex is glycerine.

4. A colored transparent resinous molding composition according to claim 1 wherein the thermoplastic resin ingredient is polyvinyl chloride.

5. A colored transparent resinous molding composition according to claim 1 wherein the thermoplastic resin ingredient is a polyolefin resin.

6. A composition according to claim 5 wherein the polyolefin resin is polyethylene.

7. A composition according to claim 5 wherein the polyolefin resin is polypropylene.

8. A method for the manufacture of a colored transparent, non-toxic molding composition which comprises:
   (a) preparing a liquid containing thermoplastic or thermosetting resin solids;
   (b) separately preparing a color complex by first adding a powdered water-soluble, oil-insoluble FD&C dyestuff in powder form to a glycerine solution to dissolve the same;
   (c) adding the dyestuff glycerine solution to an equal amount of a liquid ester of decaglycerol tetraoleate and stirring to dissolve the former into the latter to form a supernatant layer of color complex and a separate layer of unreacted materials, beneath, and separating the two layers while heating the color complex;

(d) admixing a minor amount of the color complex obtained in (c) into a major amount of the liquid containing resin solids obtained in (a) and dispersing the color complex throughout the liquid containing resin solids by mild agitation.

9. A colored thermoplastic resinous article formed from the resinous composition of claim 1.

10. A colored thermoplastic resinous article of claim 9 wherein the resin employed is polyvinyl chloride.

11. A colored thermoplastic resinous article of claim 9 wherein the resin employed is a polyolefin.

* * * * *